United States Patent
Saika

(10) Patent No.: US 7,969,622 B2
(45) Date of Patent: Jun. 28, 2011

(54) IMAGE READING APPARATUS, IMAGE FORMATION APPARATUS, IMAGE READING METHOD, IMAGE FORMATION METHOD, PROGRAM FOR CAUSING IMAGE READING METHOD TO BE EXECUTED, AND PROGRAM FOR CAUSING IMAGE FORMATION METHOD TO BE EXECUTED

(75) Inventor: Toshihiro Saika, Kanagawa (JP)

(73) Assignee: Canon Components, Inc., Kawasaki-shi (JP)

( * ) Notice: Subject to any disclaimer, the term of this patent is extended or adjusted under 35 U.S.C. 154(b) by 0 days.

(21) Appl. No.: 12/922,035

(22) PCT Filed: May 1, 2009

(86) PCT No.: PCT/JP2009/058580
§ 371 (c)(1),
(2), (4) Date: Sep. 10, 2010

(87) PCT Pub. No.: WO2010/125693
PCT Pub. Date: Nov. 4, 2010

(65) Prior Publication Data
US 2011/0043874 A1 Feb. 24, 2011

(51) Int. Cl.
*H04N 1/04* (2006.01)
(52) U.S. Cl. ........ 358/475; 358/474; 358/496; 358/497; 358/498; 358/461
(58) Field of Classification Search .................. 358/475, 358/474, 496, 497, 498, 461
See application file for complete search history.

(56) References Cited

U.S. PATENT DOCUMENTS

| | | | | |
|---|---|---|---|---|
| 5,179,454 A | * | 1/1993 | Shinada | 358/447 |
| 2006/0250661 A1 | * | 11/2006 | Susaki | 358/461 |
| 2007/0064285 A1 | * | 3/2007 | Kohara | 358/498 |

FOREIGN PATENT DOCUMENTS

| | | |
|---|---|---|
| JP | 10-154221 A | 6/1998 |
| JP | 2007-028413 A | 2/2007 |
| JP | 2007-074510 A | 3/2007 |

OTHER PUBLICATIONS

International Search Report—PCT/JP2009/058580, International Searching Authority—Japan, mailed Aug. 11, 2009.
Written Opinion of the International Searching Authority—PCT/JP2009/058580, International Searching Authority—Japan, mailed Aug. 11, 2009.

* cited by examiner

*Primary Examiner* — Houshang Safaipour
(74) *Attorney, Agent, or Firm* — Fitzpatrick, Cella, Harper & Scinto

(57) ABSTRACT

In the so-called sky-shot in which reading is performed with a platen cover (32) open, an output signal of a read image is compared with a white reference value generated from a white reference member (40). Only if a value greater than or equal to the white reference value exists in the output signal of the read image, a reading operation to be performed with a light source unit in an image sensor unit (33) turned off during an original (34) reading operation is added to each scan line reading operation.

9 Claims, 8 Drawing Sheets

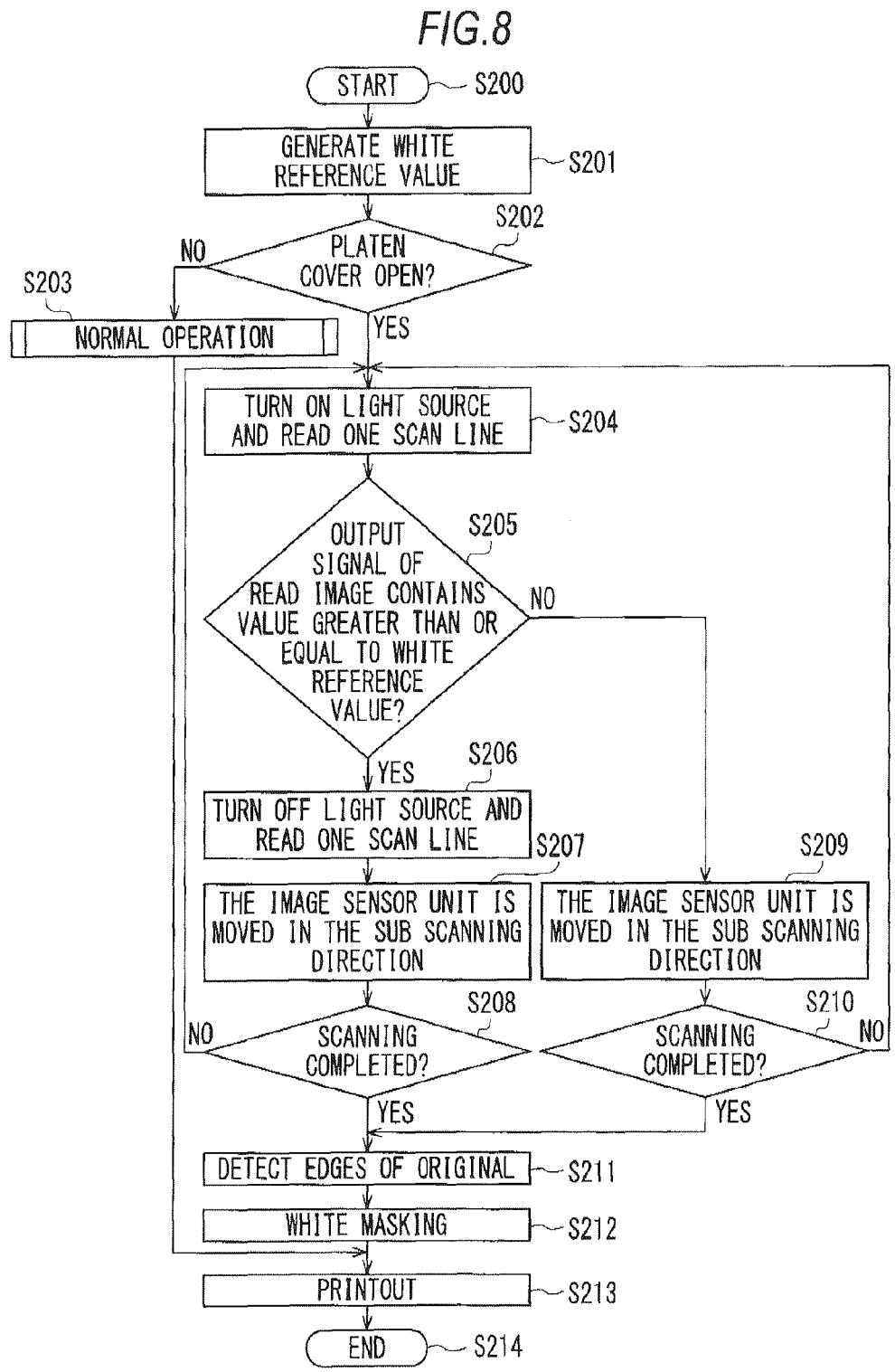

(12) United States Patent
US 7,969,622 B2

IMAGE READING APPARATUS, IMAGE FORMATION APPARATUS, IMAGE READING METHOD, IMAGE FORMATION METHOD, PROGRAM FOR CAUSING IMAGE READING METHOD TO BE EXECUTED, AND PROGRAM FOR CAUSING IMAGE FORMATION METHOD TO BE EXECUTED

TECHNICAL FIELD

The present invention relates to an image reading apparatus and, in particular, to an image reading apparatus, an image formation apparatus, an image reading method, an image formation method, a program for causing the image reading method to be executed, and a program for causing the image formation method to be executed which eliminate the effects of outside light on an image of an original in a so-called sky-shot in which the original is read with the platen cover open.

BACKGROUND ART

A platen glass (original reading surface) of an image reading apparatus of a copying machine and the like is conventionally provided with an openable and closeable platen cover that covers an original placed on the platen glass.

Typically, a thin original is read with the platen cover closed to cut off outside light whereas a thick original such as a book is read with a platen cover open in a so-called sky-shot. In the sky-shot, outside light cannot be cut off by the platen cover and the effect of outside light incident on the platen glass cause a problem that a wrong original range is read and the size of the original is not correctly recognized.

In order to address the problem, Patent Document 1, for example, proposes an image reading apparatus which includes control unit for, each time a scan line is to be read, turning off a light source and causing an image reading section to read outside light information entering a platen with a cover open and with an original placed on the platen, then turning on the light source and causing the image reading section to read an image of the original, and image processing circuit for eliminating the effect of outside light detected from the read image of the original on the basis of the outside light information.

Although the method for detecting the size of the original described in Patent Document 1 can detect the size of the original, the detection method requires, every time a scan line is read, turning off the light source and causing the image reading section to read outside light information entering the platen and then turning on the light source and causing the image reading section to read the image of the original. Accordingly, the method requires a long scanning time.

The present invention has been made in light of these circumstances and an object of the present invention is to provide an image reading apparatus and others which accurately detect the size of an original to read the original while eliminating the effect of outside light incident on a platen glass in a sky-shot, and reduce the time for detecting the size of the original and increase the efficiency.

Patent Document 1: Japanese Laid-open Patent Publication No. 2007-28413

SUMMARY OF THE INVENTION

According to the present invention, there is provided an image reading apparatus including a platen on which an original is to be placed, an openable and closeable cover for covering the platen, an original illuminating light source, a plurality of photoelectric conversion elements mounted on a sensor board, and an image formation element array including a plurality of image formation elements arranged in an array, and performing a reading operation to read an image with the original placed on the platen, image being formed on the plurality of photoelectric conversion elements through the image formation element array, the image reading apparatus including: a white reference generator for generating a white reference value by reading reflected light from a white reference member by using the plurality of photoelectric conversion elements, the reflected light being generated by turning on the original illuminating light source to illuminate the white reference member; a detector for detecting an output signal from the photoelectric conversion elements when the reading operation is performed with the cover open and the original illuminating light source turned on, a comparator for comparing the output signal with the white reference value on a scan-line-by-scan-line basis; and a controller for, if the comparison by the comparator shows that a value greater than or equal to the white reference value exists in the output signal, turning off the original illuminating light source to perform the reading operation on a scan-line-by-scan-line basis.

An image formation apparatus according to the present invention includes the image reading apparatus described above and an original edge detector for, if the comparison by the comparator shows that the value of the output signal is less than the white reference value, detecting an edge of the original on the basis of a read image obtained by performing the reading operation with the original illuminating light source turned on, and if the comparison by the comparator shows that a value greater than or equal to the white reference value exists in the output signal, detecting an edge of the original on the basis of a read image obtained by performing the reading operation with the original illuminating light source turned off; an image processor for eliminating an area other than an image of the original on the basis of the edge of the original detected by the original edge detector; and a printout unit for printing out an image processed by the image processor.

According to the present invention, there is provided an image reading method in an image reading apparatus including a platen on which an original is to be placed, an openable and closeable cover for covering the platen, an original illuminating light source, a plurality of photoelectric conversion elements mounted on a sensor board, and an image formation element array including a plurality of image formation elements arranged in an array, and performing a reading operation to read an image with the original placed on the platen, the image being formed on the plurality of photoelectric conversion elements through the image formation element array, the image reading method including: a white reference generation step of generating a white reference value by reading reflected light from a white reference member by using the plurality of photoelectric conversion elements, the reflected light being generated by turning on the original illuminating light source to illuminate the white reference member; a detection step of detecting an output signal from the photoelectric conversion elements when the reading operation is performed with the cover open and the original illuminating light source turned on; a comparison step of comparing the output signal with the white reference value on a scan-line-by-scan-line basis; and a control step of, if the comparison by the comparison step shows that a value greater than or equal to the white reference value exists in the output signal, turning off the original illuminating light source to perform the reading operation on a scan-line-by-scan-line basis.

According to the present invention, there is provided an image formation method for use with an image formation apparatus including a platen on which an original is to be placed, an openable and closeable cover for covering the platen, an original illuminating light source, a plurality of photoelectric conversion elements mounted on a sensor board, and an image formation element array including a plurality of image formation elements arranged in an array, and performing a reading operation to read an image with the original placed on the platen, the image being formed on the plurality of photoelectric conversion elements through the image formation element array, the image formation method including: a white reference generation step of generating a white reference value by reading reflected light from a white reference member by using the plurality of photoelectric conversion elements, the reflected light being generated by turning on the original illuminating light source to illuminate the white reference member; a detection step of detecting an output signal from the photoelectric conversion elements when the reading operation is performed with the cover open and the original illuminating light source turned on; a comparison step of comparing the output signal with the white reference value on a scan-line-by-scan-line basis; a control step of, if the comparison at the comparison step shows that a value greater than or equal to the white reference value exists in the output signal; turning off the original illuminating light source to perform the reading operation on a scan-line-by-scan-line basis; an original edge detecting step of, if the comparison at the comparison step shows that the value of the output signal is less than the white reference value, detecting an edge of the original on the basis of a read image obtained by performing the reading operation with the original illuminating light source turned on, and if the comparison at the comparison step shows that a value greater than or equal to the white reference value exists in the output signal, detecting an edge of the original on the basis of a read image obtained by performing the reading operation with the original illuminating light source turned off; an image processing step of eliminating an area other than an image of the original on the basis of the edge of the original detected at the original edge detection step; and a printout step of printing out an image processed at the image processing step.

A non-transitory computer readable storage medium storing a computer program according to the present invention causes a computer to execute the steps of the image reading method described above.

A non-transitory computer readable storage medium storing a computer program according to the invention causes a computer to execute the steps of the image formation method described above.

According to the present invention described above, an output signal of a read image is compared with a white reference value in a so-called sky-shot in which the original is read with a cover that covers a platen open, and if a value greater or equal to the white reference value exists in the output signal of the read image, a reading operation performed with the light source turned off is added to each reading operation to read one scan line, thereby reducing the time required for detecting the size of the original and increasing the efficiency.

BRIEF DESCRIPTION OF THE DRAWINGS

FIG. 8 is a flowchart illustrating an image reading process according to the embodiment.

DETAILED DESCRIPTION OF THE PREFERRED EMBODIMENTS

An exemplary copying machine incorporating an image reading apparatus according to the present invention will be described as an embodiment of the present invention with reference to drawings.

Figure 1:
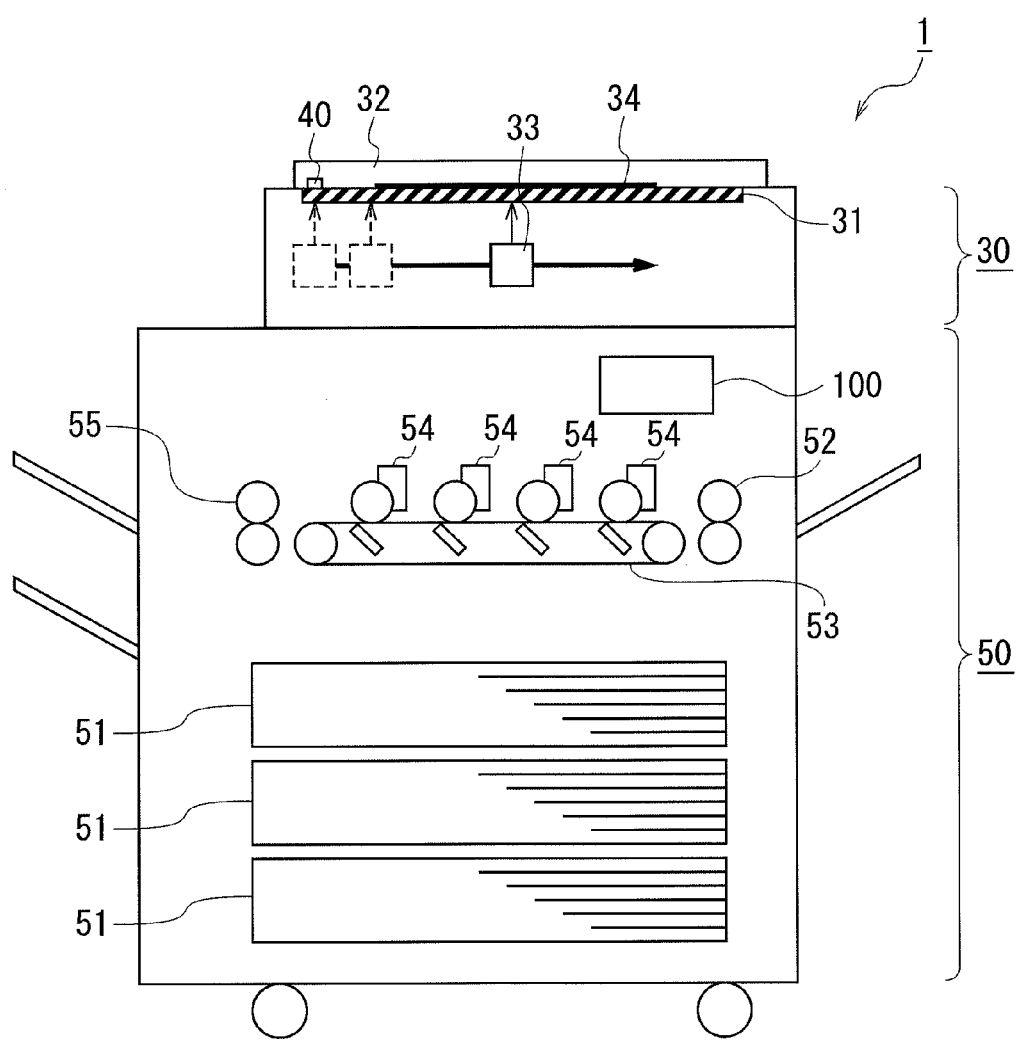
FIG. 1 is a diagram illustrating a construction of a copying machine to which the present invention can be applied.
Figure 2:
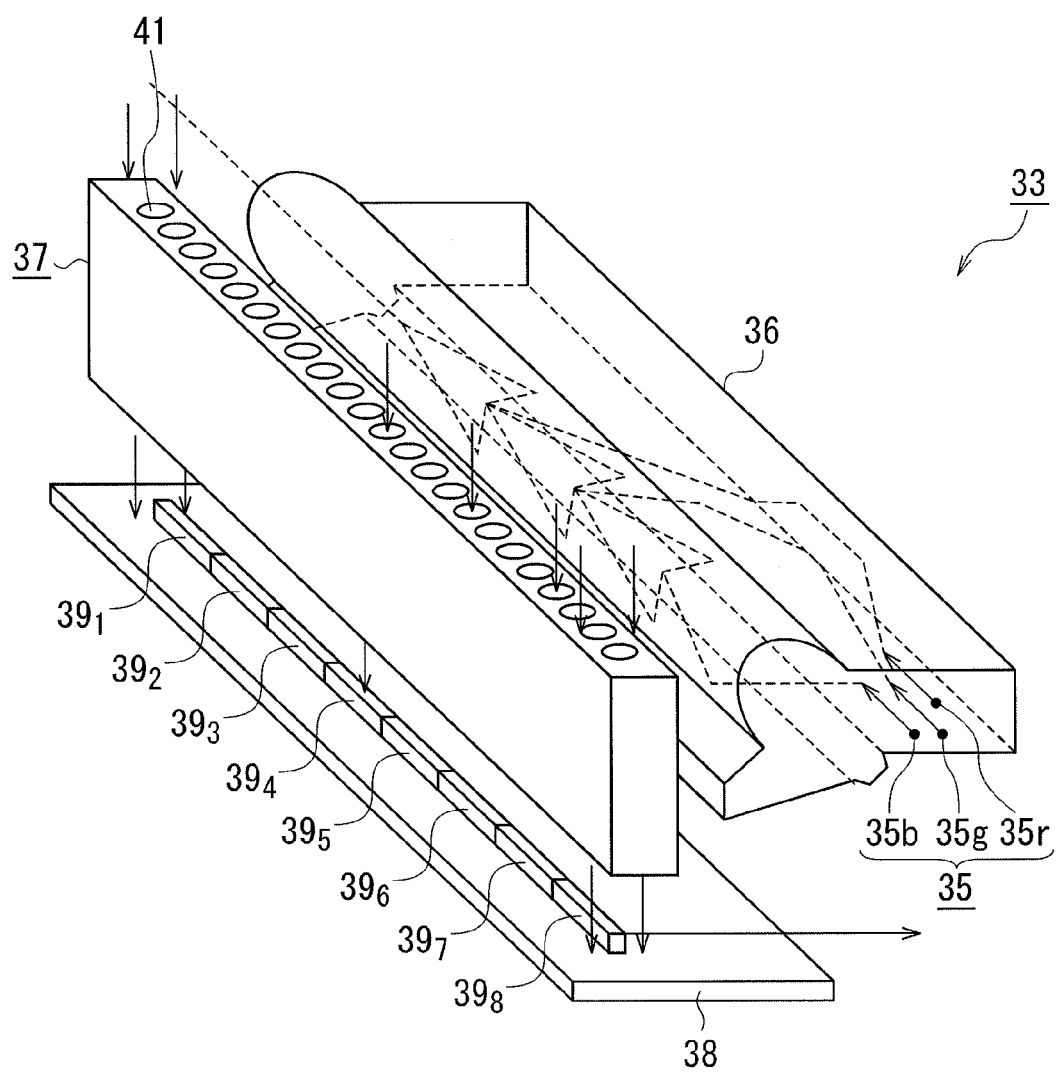
FIG. 2 is a diagram illustrating a construction of a reading section of the copying machine.

FIG. 1 is a diagram illustrating a construction of a copying machine to which the present invention can be applied. FIG. 2 is a diagram illustrating a construction of an image reading section of the copying machine. The copying machine 1 in FIGS. 1 and 2 includes an image reading section 30 and an image formation section 50. The image reading section 30 has the function of the so-called image scanner (input device) which is configured as follows.

The image reading section 30 includes a platen glass 31 as a platen, an openable and closeable platen cover 32 provided to cover an original 34 placed on the platen glass 31, and an image sensor unit 33 which is a contact image sensor (CIS) unit as an image reading apparatus.

As illustrated in FIG. 2, a light source unit 35 is provided in the image sensor unit 33. The light source unit 35 includes light-emitting elements 35r, 35g and 35b which are light-emitting diodes, each having light emitting wavelengths of at least three colors, red, green and blue (hereinafter abbreviated as RGB). The light-emitting elements 35r, 35g and 35b are turned on one after another to emit light.

Reference numeral 36 denotes a light guide 36 which guides light emitted from the light source unit 35 to the original 34. Reference numeral 37 denotes a rod lens array 37 which is an image formation element array. Reference numeral 38 denotes a sensor board 38 which is a board on which photoelectric conversion elements $39_k$ (where k is a natural number in the range from 1 to 8) are mounted. The photoelectric conversion elements $39_k$ convert reflected light (an image of an original) focused by the rod lens array 37 to an output signal. While eight photoelectric conversion elements $39_k$ are provided in the present embodiment, any number of photoelectric conversion elements $39_k$ may be provided.

Reference numeral 40 in FIG. 1 denotes a white reference member 40 which is white in color, has at least the same length (in a main scanning direction) as the photoelectric conversion element $39_k$, and is provided on an end portion on the platen glass 31 near an original reading start position not illustrated in the image reading section 30. The white reference member 40 is read by the image sensor unit 33 as white reference detection means through the platen glass 31 to generate a white reference value which acts as a reference of white color (white reference) as data.

When an image reading operation is initiated in the configuration, first a control unit 100 disposed in the image formation section 50 issues an instruction to generate data acting as a white reference value and turn on the light-emitting elements 35r, 35g and 35b provided in the light source unit 35 one after another to cause them to emit light so that the emitted light illuminates the surface of the white reference member 40 through light guide 36. The emitted light is reflected by the white reference member 40 and is focused on the photoelectric conversion elements $39_k$ provided on the sensor board 38 through the rod lens array 37 to form an image. By reading one scan line of all of RGB rays of the reflected light in the main scanning direction, data acting as a white reference value is generated. Then the image sensor unit 33 is moved in a sub scanning direction to the original reading start position.

At the original reading start position, the light-emitting elements 35r, 35g and 35b provided in the light source unit 35 are turned on one after another to substantially uniformly illuminate the surface of the original 34 through the light guide 36 in linear manner in the main scanning direction with emitted light. The illuminating light is reflected by the original 34 and is focused on the photoelectric conversion elements $39_k$ provided on the sensor board 38 by the rod lens array 37 to form an image. An operation to read one scan line of the reflected light from the original 34 is accomplished by reading one scan line of all of RGB rays of the reflected light.

After one scan line has been read, the image sensor unit 33 moves by one scan line in the sub scanning direction and similarly performs the operation of reading another scan line while illuminating the original 34 with light. By repeating the movement and the reading operation, the entire surface of the original 34 is scanned. In this way, the original is read scan-line by scan-line (normal reading).

The white reference value is a reference value used in shading correction and is data corresponding to an image having a uniform white concentration distribution. The shading correction is applied to an image of an original 34 in order to increase reproducibility of the shades of gray of the original 34. Specifically, light amount adjustment for adjusting the amount of emission of light illuminating the original 34 from the light source unit 35 through the light guide 36 is performed and gain adjustment for adjusting the gain of an image signal output from the photoelectric conversion elements $39_k$ is performed. In addition, unevenness of the amount of light in the light source unit 35 and the rod lens array 37 and unevenness of sensitivity of the photoelectric conversion elements $39_k$ are corrected pixel by pixel.

Reflected light from the original 34 is converted by the photoelectric conversion elements $39_k$ to an output signal and then is output to the control unit 100, where image processing based on the white reference value, which will be described later, is applied to the signal, and the resulting signal is output to an image formation section 50 as image print data.

The image formation section 50 has the function of the so-called printer (output device) and has the following configuration.

As illustrated in FIG. 1, the image formation section 50 includes a paper feed tray 51, a feeding roller 52, a transfer unit 53, an intermediate transfer belt 54, and a fuser unit 55.

The paper feed tray 51 can contain sheets of a predetermined size and feeds the sheets as the image formation section 50 forms an image. The transfer unit 53 forms an electrostatic latent image from image print data subjected to image processing in the control unit 100 and causes toner to adhere to the electrostatic latent image to form a toner image. The toner image is transferred onto the intermediate transfer belt 54 and then onto a sheet, which is then pressed and heated by the fuser unit 55 to fix the toner image on the sheet, thereby printing the image.

Figure 3:
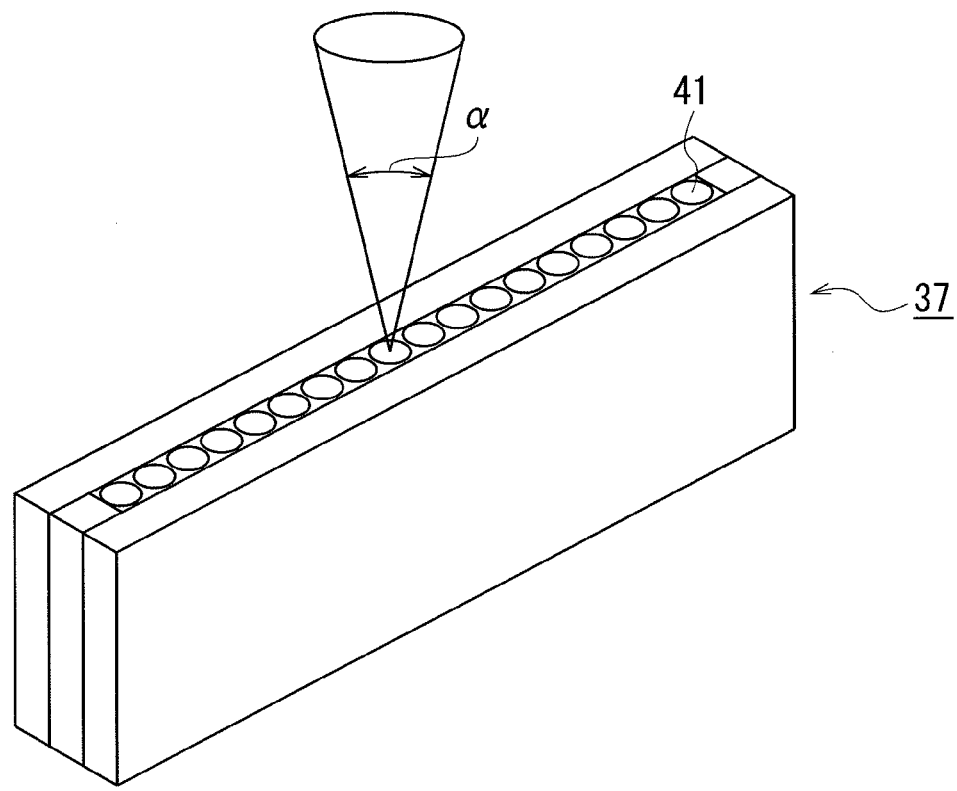
FIG. 3 is a perspective view illustrating a configuration of a rod lens array 37.

FIG. 3 illustrates a configuration of the rod lens array 37, which is an image formation element array, in the image sensor unit 33 to which the present invention can be applied. FIG. 3 is an exterior view of the rod lens array 37 used in the contact image sensor unit 33 in the present embodiment.

The rod lens array 37 is an optical component including multiple tiny rod lenses 41 which are image formation elements, arranged in an array in such a manner that their optical axes are in parallel with one another and fixed with an opaque resin, and together generate a single continuous 100%-scale erected real image.

The rod lens array 37 has a structure that eliminates outside light incident on the rod lens array 37 at an angle greater than an aperture angle α depicted in FIG. 3, has a small angle of incidence for outside light and a strong directionality against incident outside light in order to improve contrast.

When incident outside light, for example light from a fluorescent lamp, is outside the aperture angle α of the rod lens array 37 having the structure described above, the illuminance of the outside light entering the rod lens array 37 through the platen glass 31 will change.

Accordingly, there is a problem that even if the illuminance around the copying machine 1 does not change, the illuminance of outside light entering the aperture angle α of the rod lens array 37 through the platen glass 31 can change due to movement of the image sensor unit 33.

Figure 4:
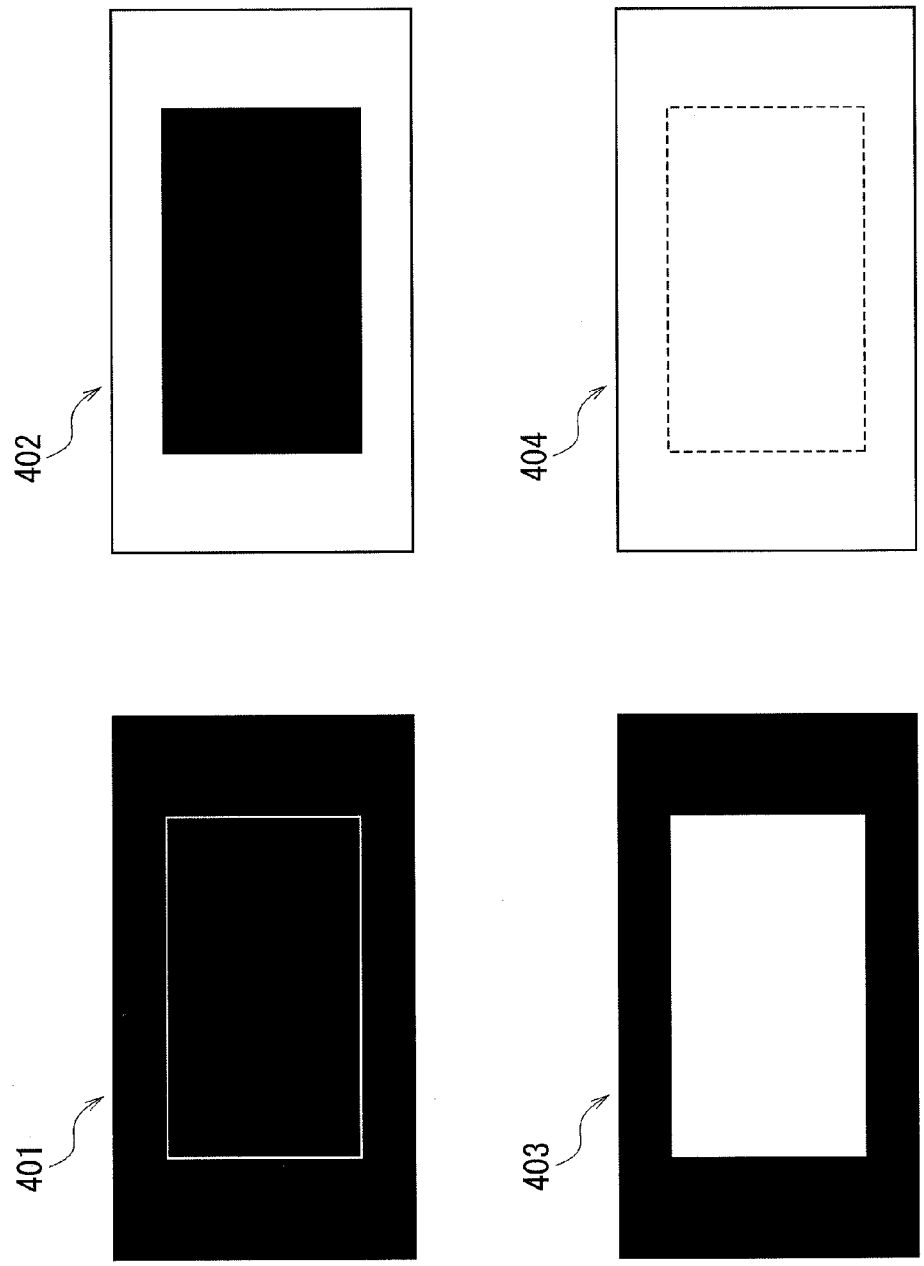
FIG. 4 is a diagram illustrating the relationship between a drive state of a light source unit 35 and an output signal of outside light during reading of an original 34.

FIG. 4 is a diagram illustrating an example in which driving of the light source unit 35 is controlled during a sky-shot to perform an operation to read an original 34 smaller than the platen glass 31 in order to detect the edges of the original 34. In FIG. 4, illustrations 401 to 404 are conceptual illustrations of read images of the original 34 placed on the platen glass 31.

Illustration 401 represents an image of the original 34 that was read under conditions where the output signal of outside light entering the aperture angle α of the rod lens array 37 had a value less than the white reference value and the light source unit 35 was turned off.

Illustration 402 represents an image of the original 34 that was read under conditions where there was a value greater than or equal to the white reference value in the output signal of outside light entering the aperture angle α of the rod lens array 37 and the light source unit 35 was turned off.

Illustration 403 represents an image of the original 34 that was read under conditions where the output signal of outside light entering the aperture angle α of the rod lens array 37 had a value less than the white reference value and the light source unit 35 was turned on.

Illustration 404 represents an image of the original 34 that was read under conditions where there is a value greater than or equal to the white reference value in the output signal of outside light entering the aperture angle α of the rod lens array 37 and the light source unit 35 is turned on.

In illustration 404, the value of the output signal of outside light entering the aperture angle α of the rod lens array 37 through the platen glass 31 is detected to be greater than or equal to the white reference value. Accordingly, the value of the region where the outside light is incident exceeds the white reference value. Therefore the region where the outside light is incident is erroneously detected as a white image and the boundary between the image of the original 34 and the outside light region cannot be identified. This case indicates that, as in illustration 402, the original 34 needs to be read with the light source unit 35 turned off to place the original 34 in a backlighted state and read the shadow of the original 34 so that the original 34 is detected as a black image to create a boundary between the image of the original 34 and the outside light region.

In illustration 403, the value of the output signal of reflected light from the original 34 and the value of the output signal of outside light entering the aperture angle α of the rod lens array 37 through the platen glass 31 are detected to less than the white reference value. Therefore, this case indicates that the region where the outside light is incident is erroneously detected as a black image and a boundary is generated between the reflected light from the original 34 and the outside light region.

In this way, the boundary of the original 34 can be identified under the conditions in illustrations 402 and 403. Therefore the edges of the original 34 can be detected during a sky-shot. However, under the conditions in illustrations 401 and 404, the boundary of the original 34 cannot be detected and therefore the edges of the original 34 cannot be detected during a sky-shot.

When sky-shot is performed under the conditions in illustrations 401 and 404, the region of the original 34 can be erroneously detected because of the effect of outside light entering the aperture angle α of the rod lens array 37. For example, if the area erroneously detected is outside the region of the original 34, a black region remains in a printed image; if the area erroneously detected is inside the region of the original 34, a portion of a printed image is deleted. Therefore, under the conditions in illustrations 401 and 404, the light source unit 35 needs to be turned on or off to detect the boundary. It should be noted that the frames in FIG. 4 are added in order to improve visibility and do not indicate the boundary generated between the original 34 and the region of outside light entering the aperture angle α of the rod lens array 37.

Here, the light source unit 35 performs color reading by switching the light-emitting elements. The switching of the light-emitting elements is driven in a time-division manner by a control circuit 103 provided in the control unit 100, which will be described later. For example, the light-emitting elements are independently turned on in the order R→G→B each time an operation to read one scan line is performed. When a monochrome original such as a text document is read, the original can be read by turning on only one or both of the light-emitting elements 35r and 35g. In this case, since the light-emitting element 35b is not turned on, the reading speed can be increased and power consumption can be saved.

It is assumed in the present embodiment that when color reading is performed, a light-emitting-element turn-off state (D) is included in the turn-on sequence, like R→G→B→D, for example, thereby adding an operation to read one scan line of the original 34 with the light source unit 35 turned off. It is also assumed that when monochrome reading is performed, the sequence G→D, for example, is performed to add an operation to read one scan line of the original 34 with the light source unit 35 turned off.

In the present embodiment, an output signal of outside light entering the aperture angle α of the rod lens array 37 is detected and the light source unit 35 is turned on and off for correct recognition of original size.

In the configuration of the present embodiment described above, there is an output difference in output signal output from the photoelectric conversion elements $39_k$ between reflected light from an original 34 and the region of outside light. Therefore, as illustrated in FIGS. 5 and 6, points at which a change has occurred from white pixels to black pixels or from black pixels to white pixels can be identified as the boundary and the size of the original can be recognized on the basis of the boundary.

Figure 5:
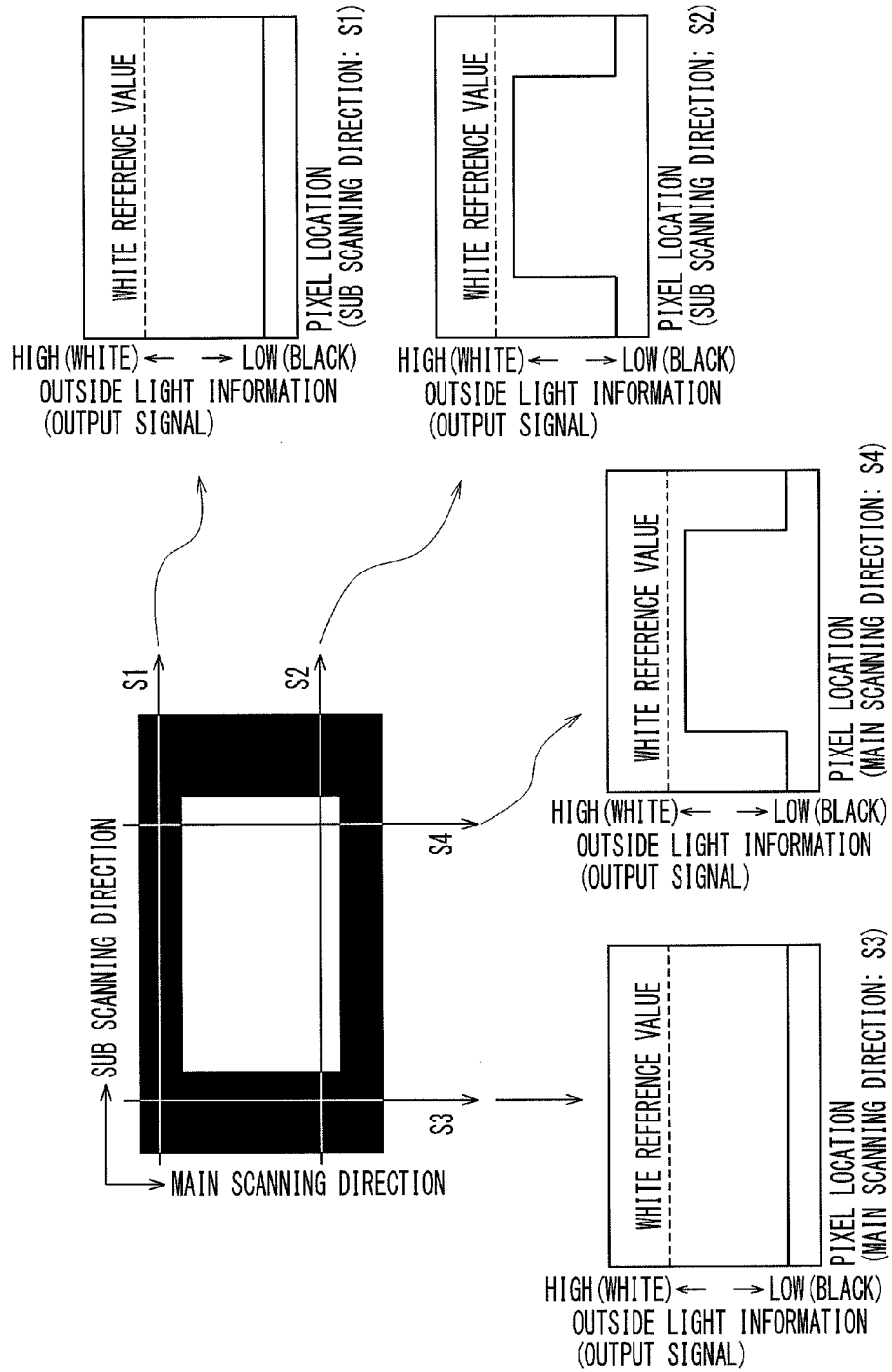
FIG. 5 depicts exemplary graphs illustrating output differences in output signals of photoelectric conversion elements $39_k$ in boundary recognition of the size of an original.
Figure 6:
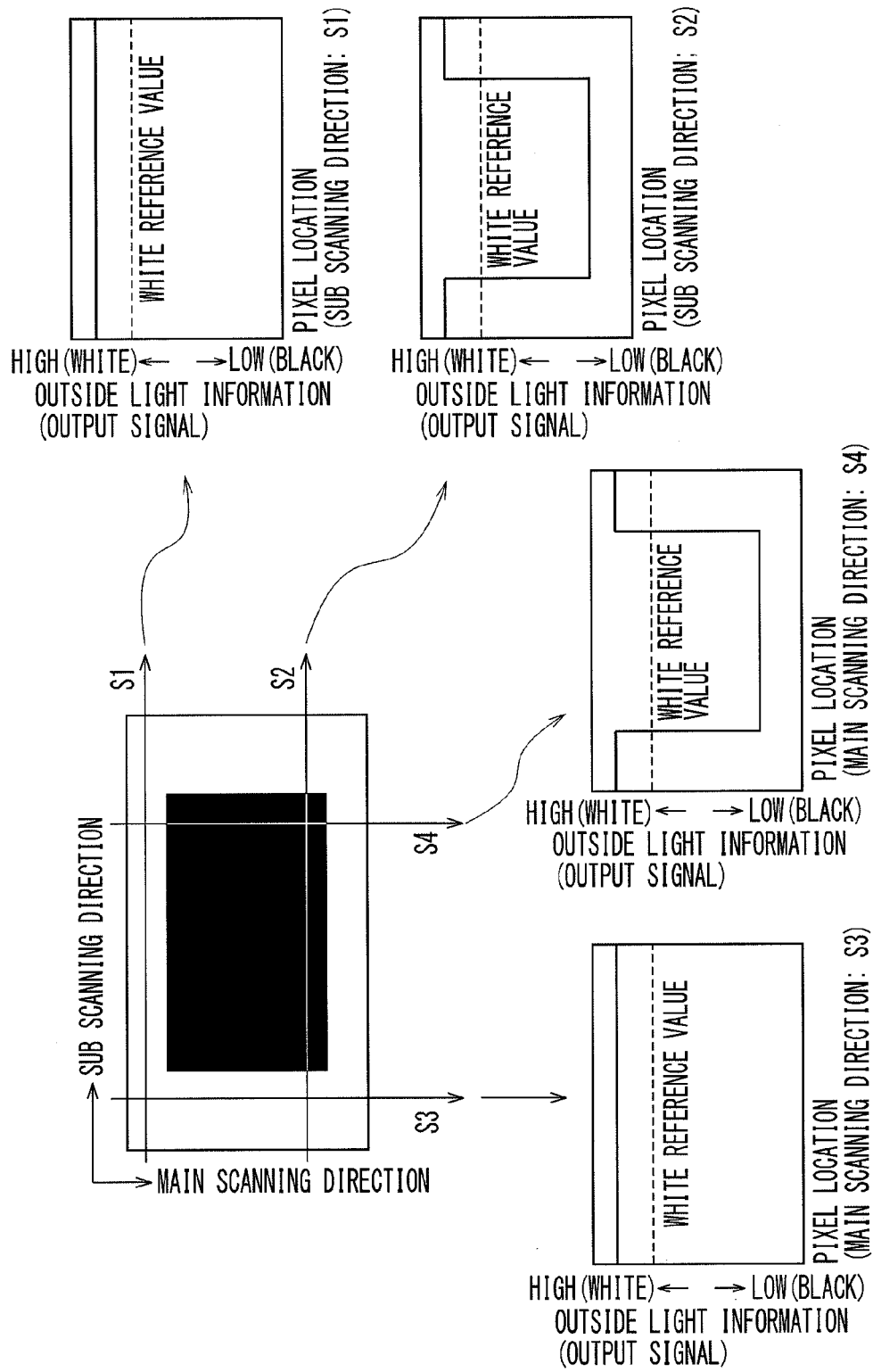
FIG. 6 depicts exemplary graphs illustrating output differences in output signals of the photoelectric conversion elements $39_k$ in boundary recognition of the size of the original.

FIG. 5 illustrates an example in which the value of the output signal of outside light entering the aperture angle α of the rod lens array 37 is less than the white reference value and the size of an original 34 is recognized from the state in which the original 34 is read with the light source unit 35 turned on. FIG. 6 illustrates an example in which a value greater than or equal to the white reference value exists in the output signal of outside light entering the aperture angle α of the rod lens array 37 and the size of the original 34 is recognized from the state in which the original 34 is read with the light source unit 35 turned off.

A configuration and operation of the control unit 100 which performs image processing in the image reading apparatus to which the present invention can be applied will be described in detail with reference to FIGS. 7 and 8.

Figure 7:
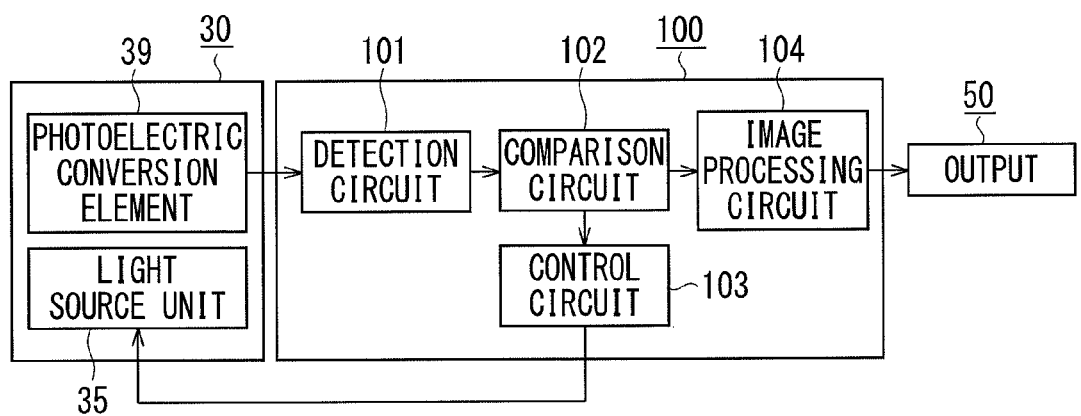
FIG. 7 is a block diagram illustrating a configuration of a control unit 100 according to an embodiment.

FIG. 7 is a block diagram illustrating a configuration of the control unit 100. As illustrated in FIG. 7, the control unit 100 is connected to the image reading section 30, which is an input device, and to the image formation section 50, which is an output device.

The control unit 100 includes a detection circuit 101, which is detection means, a comparison circuit 102, which is comparison means, a control circuit 103, which is control means, and an image processing circuit 104, which is image processing means.

When a reading operation is initiated in this configuration, first the light source unit 35 is turned on and one scan line of reflected light from the white reference member 40 is read by the detection circuit 101 to generate data that acts as a white reference value. The white reference value data is output to the comparison circuit 102 and the image processing circuit 104.

Then, the image sensor unit 33 is moved to the original reading start position. A platen cover open/closed sensor, not illustrated, determines whether the platen cover 32 is open or closed. If the platen cover 32 is open, the control circuit 103 determines that the image reading process is to be performed with sky-shot.

Then, after the image sensor unit 33 has moved to the original reading start position, the control circuit 103 causes the detection circuit 101 to turn on the light source unit 35 to perform an operation to read one scan line to detect a read image (reflected light from the original 34 and outside light entering the aperture angle α of the rod lens array 37 through the platen glass 31) and outputs the read image to the comparison circuit 102 and the image processing circuit 104 as an output signal. The read image output to the comparison circuit 102 as the output signal of the read image is compared with the white reference value.

If the comparison shows that a value greater than or equal to the white reference value exists in the output signal of the read image, an operation to read one scan line of the image of the original 34 is performed with the light source unit 35 turned off and the read data is output to the image processing circuit 104 as data for detecting the edges of the original 34.

Then, the image sensor unit 33 moves in the sub scanning direction by one scan line. The image sensor unit 33 again detects a read image and outputs the read image to the comparison circuit 102 and the image processing circuit 104 as an output signal. Again, the read image is compared with the white reference value at the comparison circuit 102. If there is not a change in the relation between the read image and the white reference value, the sequence of movement of the image sensor unit 33 in the sub scanning direction by one scan line, the operation of reading one scan line with the light source unit 35 turned off and outputting to the image processing circuit 104 is repeated each time an operation to read one scan line is performed until all data is read.

As a result, the read image as reflected light read with the light source unit 35 turned on and the read image as data for detecting the edges of the original read with the light source unit 35 turned off are output to the image processing circuit 104.

On the other hand, if the value of the output signal of the read image is less than the white reference value, the image sensor unit 33 moves in the sub scanning direction by one scan line, and again detects a read image and outputs the read image to the comparison circuit 102 and the image processing circuit 104 as an output signal. The read image is compared with the white reference value at the comparison circuit 102. If there is not a change in relation between the output signal of the read image and the white reference value, the edges of the original can be detected from the read image and therefore the read image reading operation is repeated until all data has been read.

The read image output to the image processing circuit 104 is subjected to shading correction, then to original edge detection for detecting the boundary between the region of reflected light from the original 34 and the region of outside light, and white masking is performed on the basis of the detected edges of the original to mask the region of the outside light. The resulting read image is output to the image formation section 50 as image print data. The image formation section 50 prints the image on the basis of the output image print data. The white masking is processing to mask the region of outside light on the basis of the detected edges of the original to eliminate the region of the outside light from the print range in the image print data.

FIG. 8 is a flowchart illustrating an image reading process performed by the control unit 100. The image reading process is applied to an operation to read an original 34 during sky-shot image reading.

As illustrated in FIG. 8, when a user inputs an instruction to initiate a reading operation (step S200), the image reading process starts and the control circuit 103 directs the detection circuit 101 to generate data acting as a white reference value.

The detection circuit 101 reads one scan line of reflected light from the white reference member 40 to generate a white reference value and outputs the white reference value to the comparison circuit 102 and the image processing circuit 104 (step S201). Then the control circuit 103 moves the image sensor unit 33 in the sub scanning direction.

Then, the control circuit 103 determines, on the basis of a detection signal provided from the platen cover open/closed sensor (not illustrated), whether the platen cover 32 is open or closed (step S202). If the control circuit 103 determines that the platen cover 32 is closed (step S202: NO), the control circuit 103 determines that the reading operation is normal reading for reading the original 34 with the platen cover 32 closed rather than sky-shot, and proceeds to normal processing (step S203).

On the other hand, the control circuit 103 determines that the platen cover 32 is open (step S202: YES), the control circuit 103 determines that the reading operation is sky-shot and directs the detection circuit 101 to perform an operation to read one scan line of the reading surface of the platen glass 31 (step S204). The control circuit 103 controls the movement of the image sensor unit 33 in the sub scanning direction and also controls the timings of turning on and off of the LEDs of the light source unit 35. Thus, one scan line of reflected light from the original 34 is read with the light-emitting elements of the light source unit 35 turned on.

Then the detection circuit 101 outputs the read image of the scan line to the comparison circuit 102 and the image processing circuit 104. The comparison circuit 102 receives the white reference value and the read image and compares the output signal of the read image with the white reference value (step S205).

Here, if there is a value in the output signal of the read image that is greater than or equal to the white reference value (step S205: YES), an operation to read one scan line of the image of the original 34 is performed at the same location with the LEDs of the light source unit 35 turned off by the control circuit 103, the read image is output to the image processing circuit 104 as data for detecting the edges of the original 34 (step S206), and the image sensor unit 33 is moved in the sub scanning direction (step S207).

Then, the control circuit 103 determines whether scanning of the entire original 34 in the sub scanning direction has been completed or not (step S2081). If the scanning has not been completed (step S208: NO), the control circuit 103 returns to step S204 and repeats the process from step S204 through step S208. If the scanning has been completed (step S208: YES), the process will end.

On the other hand, if the value of the output signal of the read image is less than the white reference value (step S205: NO), the control circuit 103 moves the image sensor unit 33 in the sub scanning direction (step S209). The control circuit 103 determines whether the scanning of the entire original 34 in the sub scanning direction has been completed or not (step S210). If the scanning has not been completed (step S210: NO), the control circuit 103 returns to step S204 and repeats the process in steps S204, S205, S209 and S210. If the scanning has been completed (step S210: YES), the process will end.

If there is a change in the relation between the output signal of the read image and the white reference value before the scanning in the sub scanning direction of the entire image 34 has been completed at step S205, the process proceeds to steps S204 through S208 or steps S204, S205, S209, and S210 depending on the result of step S205.

When the image processing circuit 104 receives all output signals of the scanned read image, the image processing circuit 104 applies shading correction to the read image on the basis of the white reference value and then performs original edge detection to detect the boundary between the region of the reflected light from the original 34 and the region of outside light (step S211).

The image processing circuit 104 uses a mask signal to perform white masking of the region of outside light on the basis of the edges of the original detected at step S211 and outputs the result to the image formation section 50 as image print data (step S212).

Then, the image formation section 50 prints the image on the basis of the image print data output from the image processing circuit 104 (step S213). With this, sky-shot image reading will end (step S214).

In this way, according to the present embodiment, when image processing is performed in the so-called sky-shot in which an original is read with the platen cover open, a white reference value read from the white reference member 40 is compared with the output signal of a read image containing reflected light from the original 34 and outside light entering the aperture angle α of the rod lens array 37 through the platen glass 31. Only if the comparison shows that a value greater than or equal to the whiter reference value exists in the output signal of the read image, an operation to read one scan line with the light source unit 35 turned off is added to an operation to read one scan line with the light source unit 35 turned on.

With the configuration, according to the present embodiment, the edges of an original 34 can be detected by recognizing the size of the original 34 on the basis of the boundary between the region of reflected light from the original 34 and the region of outside light regardless of the illuminance around the copying machine 1, and white masking can be applied to the region of the outside light around the original 34. Accordingly, the effect of outside light other than the reflected light from the light source unit 35 can be eliminated from an image of the original during sky-shot. In addition, since an image reading operation is performed with the light turned off as necessary, the time required for original size detection can be reduced and the efficiency can be increased.

Furthermore, since the function of detection control supporting sky-shot can be added simply by making a minor modification to the image sensor unit 33 and an image processing program rather than a major modification, the functionality of the copying machine 1 can be improved at low cost.

Since comparison between the white reference value and the output signal of a read image is performed each time an operation to read one scan line is performed, a quick response can be made to a change in illuminance around the copying machine 1 and the effect of outside light can be eliminated to allow the original to be reliably read.

While the contact image sensor unit is used in the image reading section in the present embodiment, a minification optical system image sensor unit may be used instead.

Light-emitting elements provided in the light source unit 35 may be white light sources and RGB filters may be used to accomplish color reading. In this case, the same effects that have been described above can be provided by repeating an operation to read one scan line with light turned on and an operation to read one scan line with light turned off.

INDUSTRIAL APPLICABILITY

The present invention is a technique useful for image reading apparatuses of image scanners, facsimile machines, copying machines and the like.

What is claimed is:

1. An image reading apparatus comprising:
a platen on which an original is to be placed;
an openable and closeable cover for covering the platen;
an original illuminating light source;
a plurality of photoelectric conversion elements mounted on a sensor board; and
an image formation element array including a plurality of image formation elements arranged in an array, and performing a reading operation to read an image with the original placed on the platen, the image being formed on the plurality of photoelectric conversion elements through the image formation element array;
a white reference generator for generating a white reference value by reading reflected light from a white reference member by using the plurality of photoelectric conversion elements, the reflected light being generated by turning on the original illuminating light source to illuminate the white reference member;
a detector for detecting an output signal from the photoelectric conversion elements when the reading operation is performed with the cover open and the original illuminating light source turned on;
a comparator for comparing the output signal with the white reference value on a scan-line-by-scan-line basis; and
a controller for, if the comparison by the comparator shows that a value greater than or equal to the white reference value exists in the output signal, turning off the original illuminating light source to perform the reading operation on a scan-line-by-scan-line basis.

2. The image reading apparatus according to claim 1, wherein the original illuminating light source comprises light-emitting elements of at least three different colors.

3. An image formation apparatus comprising the image reading apparatus according to claim 1, and further comprising:
an original edge detector for, if the comparison by the comparator shows that the value of the output signal is less than the white reference value, detecting an edge of the original on the basis of a read image obtained by performing the reading operation with the original illuminating light source turned on, and if the comparison by the comparator shows that a value greater than or equal to the white reference value exists in the output signal, detecting an edge of the original on the basis of a read image obtained by performing the reading operation with the original illuminating light source turned off;
an image processor for eliminating an area other than an image of the original on the basis of the edge of the original detected by the original edge detector; and
a printout unit for printing out an image processed by the image processor.

4. An image reading method for use with an image reading apparatus comprising a platen on which an original is to be placed, an openable and closeable cover for covering the platen, an original illuminating light source, a plurality of photoelectric conversion elements mounted on a sensor board, and an image formation element array including a plurality of image formation elements arranged in an array, and performing a reading operation to read an image with the original placed on the platen, the image being formed on the plurality of photoelectric conversion elements through the image formation element array, the image reading method comprising:
a white reference generation step of generating a white reference value by reading reflected light from a white reference member by using the plurality of photoelectric conversion elements, the reflected light being generated by turning on the original illuminating light source to illuminate the white reference member;
a detection step of detecting an output signal from the photoelectric conversion elements when the reading operation is performed with the cover open and the original illuminating light source turned on;
a comparison step of comparing the output signal with the white reference value on a scan-line-by-scan-line basis; and
a control step of, if the comparison in the comparison step shows that a value greater than or equal to the white reference value exists in the output signal, turning off the original illuminating light source to perform the reading operation on a scan-line-by-scan-line basis.

5. The image reading method according to claim 4, wherein the original illuminating light source comprises light-emitting elements of at least three different colors.

6. An image formation method for use with an image formation apparatus comprising a platen on which an original is to be placed, an openable and closeable cover for covering the platen, an original illuminating light source, a plurality of photoelectric conversion elements mounted on a sensor board, and an image formation element array including a plurality of image formation elements arranged in an array, and performing an reading operation to read an image with the original placed on the platen, the image being formed on the plurality of photoelectric conversion elements through the image formation element array, the image formation method comprising:

- a white reference generation step of generating a white reference value by reading reflected light from a white reference member by using the plurality of photoelectric conversion elements, the reflected light being generated by turning on the original illuminating light source to illuminate the white reference member;
- a detection step of detecting an output signal from the photoelectric conversion elements when the reading operation is performed with the cover open and the original illuminating light source turned on;
- a comparison step of comparing the output signal with the white reference value on a scan-line-by-scan-line basis;
- a control step of, if the comparison in the comparison step shows that a value greater than or equal to the white reference value exists in the output signal, turning off the original illuminating light source to perform the reading operation on a scan-line-by-scan-line basis;
- an original edge detecting step of, if the comparison in the comparison step shows that the value of the output signal is less than the white reference value, detecting an edge of the original on the basis of a read image obtained by performing the reading operation with the original illuminating light source turned on, and if the comparison in the comparison step shows that a value greater than or equal to the white reference value exists in the output signal, detecting an edge of the original on the basis of a read image obtained by performing the reading operation with the original illuminating light source turned off;
- an image processing step of eliminating an area other than an image of the original on the basis of the edge of the original detected at the original edge detection step; and
- a printout step of printing out an image processed at the image processing step.

7. The image reading method according to claim 6, wherein the original illuminating light source comprises light-emitting elements of at least three different colors.

8. A non-transitory computer readable storage medium storing a computer program for causing a computer to execute the steps of the image reading method according to claim 4.

9. A non-transitory computer readable storage medium storing a computer program for causing a computer to execute the steps of the image formation method according to claim 6.

* * * * *